(12) United States Patent
Gamel et al.

(10) Patent No.: US 10,489,811 B2
(45) Date of Patent: Nov. 26, 2019

(54) METHOD AND SYSTEM FOR PROVIDING A REWARD BASED ON A PRICE DIFFERENTIAL FOR A PRODUCT

(71) Applicant: MasterCard International Incorporated, New York, NY (US)

(72) Inventors: John Gamel, Bellevue, WA (US); Michael Berry, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1339 days.

(21) Appl. No.: 14/207,870

(22) Filed: Mar. 13, 2014

(65) Prior Publication Data

US 2015/0262211 A1    Sep. 17, 2015

(51) Int. Cl.
| | |
|---|---|
| *G06Q 30/02* | (2012.01) |
| *G06Q 20/24* | (2012.01) |
| *G06Q 20/34* | (2012.01) |
| *G06Q 20/40* | (2012.01) |
| *G06Q 50/06* | (2012.01) |
| *G06Q 20/22* | (2012.01) |

(52) U.S. Cl.
CPC ......... *G06Q 30/0215* (2013.01); *G06Q 20/22* (2013.01); *G06Q 20/24* (2013.01); *G06Q 20/34* (2013.01); *G06Q 20/409* (2013.01); *G06Q 50/06* (2013.01)

(58) Field of Classification Search
CPC .... G06Q 30/0215; G06Q 20/22; G06Q 20/24; G06Q 20/409; G06Q 20/34; G06Q 50/06
See application file for complete search history.

(56) References Cited

U.S. PATENT DOCUMENTS

| | | |
|---|---|---|
| 6,862,580 B1 | 3/2005 | Ford |
| 6,882,900 B1 | 4/2005 | Terranova |
| 7,478,747 B2 | 1/2009 | Call et al. |
| 8,100,332 B2 | 1/2012 | Call et al. |

(Continued)

OTHER PUBLICATIONS

A Method to Credit Purchased Items with Price Protection Guarantee Automatically ip.com Disclosure No. IPCOM000166587D Original Publication Date: Jan. 17, 2008 Included in the Prior Art Database: Jan. 17, 2008.*

*Primary Examiner* — Victoria E Frunzi
(74) *Attorney, Agent, or Firm* — Armstrong Teasdale LLP (57) ABSTRACT

A computer-implemented method for providing a reward based on a price differential for a product is described. The method is implemented using a computing device in communication with one or more memory devices. The method includes receiving, by the computing device, a reward determination request message including an identification of a first merchant and product data for a product purchased by a cardholder from the first merchant. The method also includes determining a location of the first merchant, determining, using the one or more memory devices, the price differential between a first price for the product from the first merchant and at least a second price for the product from at least a second merchant within a predetermined geographic distance of the first merchant, and applying a reward to a cardholder account associated with the cardholder, wherein the reward is based on the price differential.

18 Claims, 8 Drawing Sheets

(56) References Cited

U.S. PATENT DOCUMENTS

| | | | |
|---|---|---|---|
| 8,577,698 B2 * | 11/2013 | Shuster | G06Q 30/00 705/35 |
| 8,892,468 B1 * | 11/2014 | Litle | G06Q 40/02 705/35 |
| 9,105,022 B1 * | 8/2015 | Sharma | G06Q 20/201 |
| 2002/0194122 A1 | 12/2002 | Knox et al. | |
| 2003/0197060 A1 | 10/2003 | Coyner | |
| 2007/0290039 A1 | 12/2007 | Pfleging et al. | |
| 2013/0046669 A1 | 2/2013 | Harris | |
| 2013/0304264 A1 | 11/2013 | Shao | |

\* cited by examiner

FIG. 8

METHOD AND SYSTEM FOR PROVIDING A REWARD BASED ON A PRICE DIFFERENTIAL FOR A PRODUCT

BACKGROUND

This description relates to processing payment transactions, and more specifically to applying a reward to an account associated with a cardholder based on a comparison of prices for a product in a geographic region.

In many instances, the same product may be sold by two or more merchants for different prices. For example, within a city, multiple gas stations may sell the same grade of gasoline for different prices. As another example, the same model of computer may be sold by two or more different merchants at different prices. Accordingly, a consumer may spend time and effort comparing prices for the same product from the different merchants, in order to find the best price for the product. In many instances, the time and effort involved in comparing prices for the product outweighs any cost savings resulting from purchasing the product from a merchant who sells the product at a lower price than another merchant.

BRIEF DESCRIPTION OF THE DISCLOSURE

In one aspect, a computer-implemented method for providing a reward based on a price differential for a product is provided. The method is implemented using a computing device in communication with one or more memory devices. The method includes receiving, by the computing device, a reward determination request message including an identification of a first merchant and product data for a product purchased by a cardholder from the first merchant. The method also includes determining a location of the first merchant, determining, using the one or more memory devices, the price differential between a first price for the product from the first merchant and at least a second price for the product from at least a second merchant within a predetermined geographic distance of the first merchant, and applying a reward to a cardholder account associated with the cardholder, wherein the reward is based on the price differential.

In another aspect, a computing device for providing a reward based on a price differential for a product is provided. The computing device includes one or more processors in communication with one or more memory devices. The computing device is configured to receive a reward determination request message including an identification of a first merchant and product data for a product purchased by a cardholder from the first merchant, determine a location of the first merchant, determine, using the one or more memory devices, a price differential between a first price for the product from the first merchant and at least a second price for the product from at least a second merchant within a predetermined geographic distance of the first merchant, and apply a reward to a cardholder account associated with the cardholder, wherein the reward is based on the price differential.

In yet another aspect, a computer-readable storage medium having computer-executable instructions embodied thereon is provided. When executed by a computing device having one or more processors in communication with one or more memory devices, the computer-executable instructions cause the computing device to receive a reward determination request message including an identification of a first merchant and product data for a product purchased by a cardholder from the first merchant, determine a location of the first merchant, determine, using the one or more memory devices, a price differential between a first price for the product from the first merchant and at least a second price for the product from at least a second merchant within a predetermined geographic distance of the first merchant, and apply a reward to a cardholder account associated with the cardholder, wherein the reward is based on the price differential.

BRIEF DESCRIPTION OF THE DRAWINGS

FIGS. 1-8 show example embodiments of the methods and systems described herein.

DETAILED DESCRIPTION OF THE DISCLOSURE

Implementations of systems described herein determine a price differential between a price paid for a product or a service (both referred to herein as a product, for simplicity), and prices for the same product in a surrounding geographic area. The systems described herein, which are referred to as a reward determination system, additionally apply a reward to an account associated with the purchaser of the product, based on the price differential. For example, the purchaser may be a holder of a payment card (a "cardholder") who purchases gasoline at a first gas station using the payment card. Implementations of the reward determination system described herein may process a transaction for the purchase of the gasoline, then apply a credit to the cardholder's account based on a price difference between the gasoline purchased by the cardholder at the first gas station, and the price of gasoline offered at a second gas station that is within a predetermined geographic distance (e.g., five miles) of the first gas station. For example, if the reward determination system determines from the transaction that the cardholder purchased ten gallons of gas at $3.50 per gallon at the first gas station, and the second gas station offers the same grade of gasoline for $3.47, the reward determination system is configured to apply a credit of $0.30 to the cardholder's account. Accordingly, in such implementations, the cardholder effectively receives the lower price of gas from the second gas station, without having to actually purchase the gasoline from the second gas station.

An identifier identifying the merchants along with the merchants' locations, and the merchants' prices for the product are stored in a database that is accessible to the reward determination system. In some implementations, the system obtains the prices for the product based on transactions made by cardholders with the various merchants. In such an embodiment, the reward determination system is integrated with or in communication with a payment network configured to process multiple payment transactions initiated with payment cards. In some implementations, the system obtains prices for the product from at least one external source. For example, the system may access a third-party database of merchants, merchant locations, and associated product prices. These and other features of systems and methods that may be implemented by the systems are described in more detail below.

The methods and systems described herein may be implemented using computer programming or engineering techniques including computer software, firmware, hardware or any combination or subset thereof, wherein the technical effect may include at least one of: (a) receiving, by a computing device, a reward determination request message including an identification of a first merchant and product data for a product purchased by a cardholder from the first merchant; (b) determining a location of the first merchant; (c) determining, using one or more memory devices, a price differential between a first price for the product from the first merchant and at least a second price for the product from at least a second merchant within a predetermined geographic distance of the first merchant; and (d) applying a reward to a cardholder account associated with the cardholder, wherein the reward is based on the price differential.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
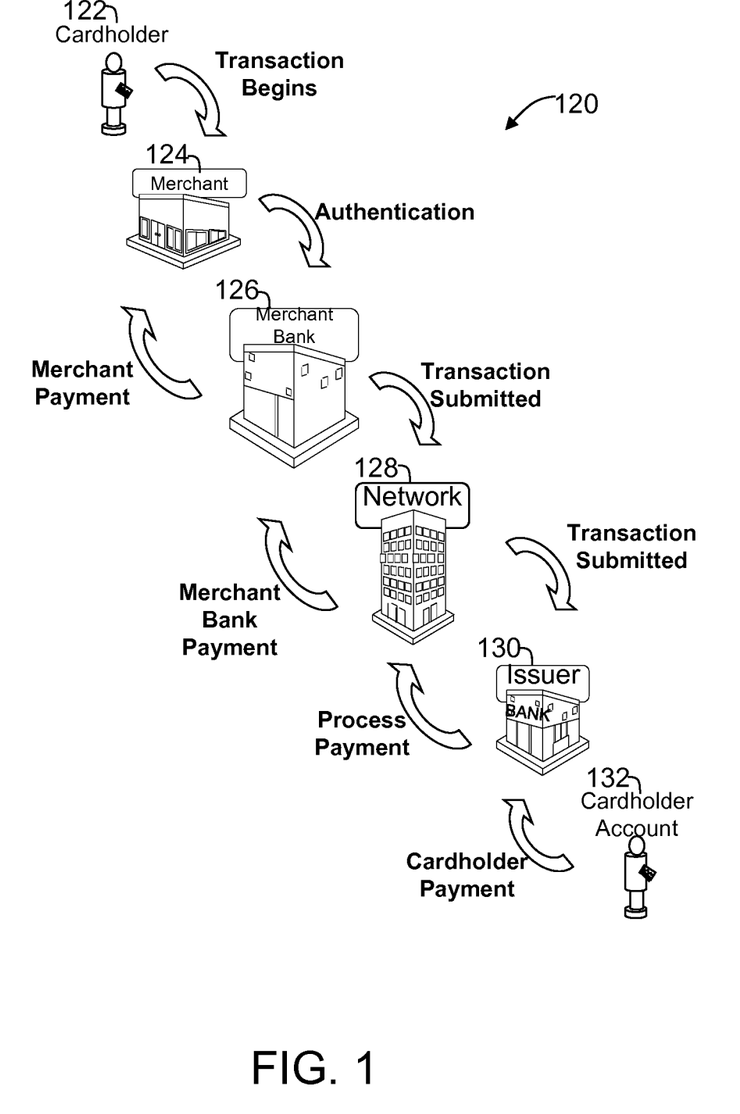
FIG. 1 is a schematic diagram illustrating an example multi-party payment card industry system for enabling ordinary payment-by-card transactions in which merchants and card issuers do not necessarily have a one-to-one relationship.

FIG. 1 is a schematic diagram illustrating an example multi-party payment card system 120 for enabling ordinary payment-by-card transactions in which merchants and card issuers do not necessarily have a one-to-one relationship. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment card for an account, such as a credit card account or a debit card account, to a cardholder 122, who uses the payment card to tender payment for a purchase from a merchant 124. To accept payment with the payment card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment card (also known as a financial transaction card), merchant 124 requests authorization from acquirer 126 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor."

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is settled between merchant 124, acquirer 126, and issuer 130. Settlement refers to the transfer of financial data or funds between the merchant's account, acquirer 126, and issuer 130 related to the transaction. Usually, transactions are captured and accumulated into a "batch," which is settled as a group.

Figure 2:
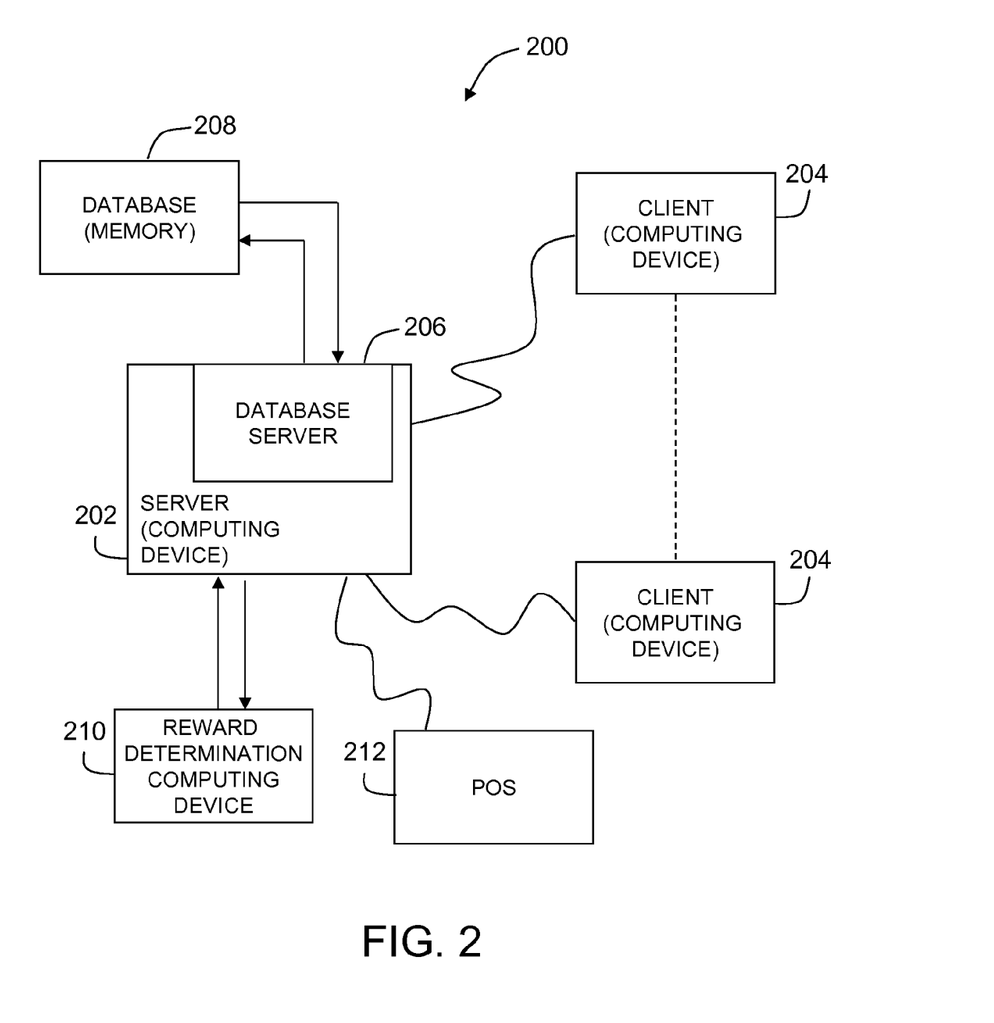
FIG. 2 is a simplified block diagram of an example payment processing system that includes a reward determination computing device and other computing devices in accordance with one example embodiment of the present disclosure.
Figure 3:
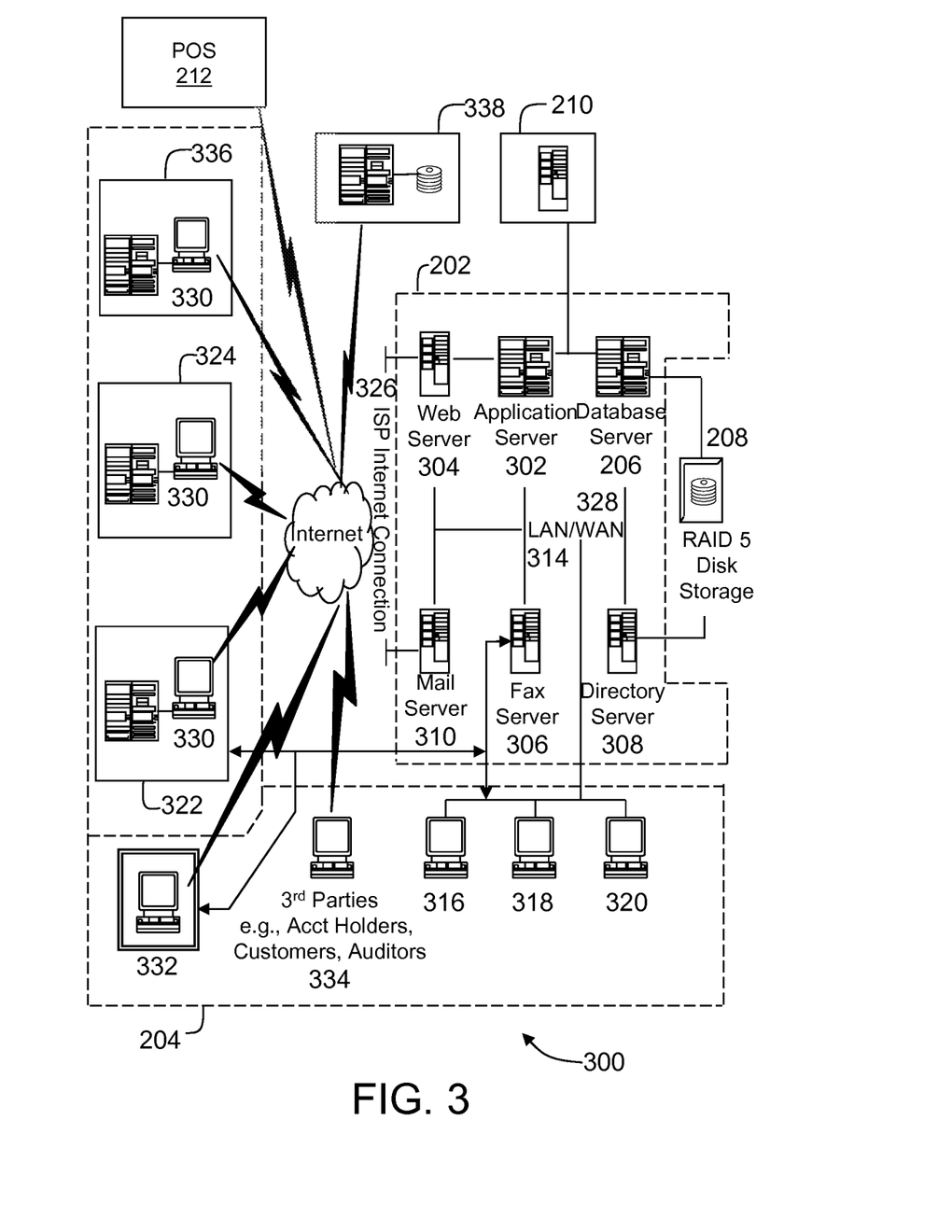
FIG. 3 is an expanded block diagram of an example embodiment of a server architecture of the payment processing system including the reward determination computing device and a plurality of other computing devices in accordance with one example embodiment of the present disclosure.

FIG. 2 is a simplified block diagram of a payment processing system 200 that includes a reward determination computing device 210 and other computing devices in accordance with one embodiment of the present disclosure. In the example embodiment, system 200 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. System 200 includes at least one point-of-sale device 212 in communication with server system 202. Additionally, reward determination computing device 210 is in communication with server system 202. In some implementations, reward determination computing device 210 is incorporated into or integrated within server system 202.

As discussed below, payment processing system 200 processes payments from transactions between cardholders and merchants. In processing such payments, server system 202 accesses and populates card transaction data ("transaction data"), stored in database 208. The transaction data includes, for example, merchant identifiers, merchant locations, transaction amounts, product identifiers (e.g., stock keeping units (SKUs)), and transaction dates. One or more of the transactions may be initiated at point-of-sale device 212. Accordingly, based on the transaction data, and/or based at least in part on supplemental data obtained by server system 202 and/or reward determination computing device 210, from an external or third-party database 338 (FIG. 3), database 208 is populated with identifications of merchants, the location of each merchant, and the prices charged by each merchant for at least one product. Reward determination computing device 210 accesses such data and calculates price differentials between prices for a given product from merchants within the geographic region. More specifically, reward determination computing device 210 determines the lowest price for the product among the merchants within the geographic region. Additionally, reward determination computing device 210 applies a reward (e.g., a credit) to an account associated with a cardholder who purchased the product at a price that was not the lowest price. For example, the reward may be based on the difference between the price paid by the cardholder and the lowest price, as determined by reward determination computing device 210. It should be understood that circumstances may occur in which a price offered by a merchant is not accurately reflected in the data available to reward determination computing device 210. Accordingly, and as will be appreciated by those skilled in the art, references to a "lowest price" refer to a lowest price determined by reward determination computing device 210 based on data available to reward determination computing device 210 (e.g., from database 208).

FIG. 3 is an expanded block diagram of an example embodiment of a server architecture of payment processing system 200 in accordance with one embodiment of the present disclosure. Payment processing system 200 includes server system 202, client systems 204, reward determination computing device 210, and point-of-sale device 212. Server system 202 includes database server 206, an application server 302, a web server 304, a fax server 306, a directory server 308, and a mail server 310. Database 208 (e.g., a disk storage unit), is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including acquirers 322 and issuers 324, and to third parties, e.g., auditors, 334 using an Internet connection 326. Server system 202 is also communicatively coupled with at least one merchant 336. Server system 202 is also communicatively coupled to at least one point-of-sale device 212 and to reward determination computing device 210. In some embodiments, reward determination computing device 202 is integrated within server system 202. Additionally, server system 202 may be communicatively coupled to an external (i.e., third-party) database 338 that includes identifications of merchants, a location of each merchant, and a price charged by each merchant for at least one product. For example, external database 338 may include a price per gallon for a grade of gasoline offered by a plurality of merchants (i.e., gas stations), along with identifications of the merchants and the locations of the merchants. In some implementations, server system 202 and/or reward determination computing device 210 may populate database 208 with information from external database 338. In some implementations, reward determination computing device 210 accesses information in external database 338 without populating database 208 with such information. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

Figure 4:
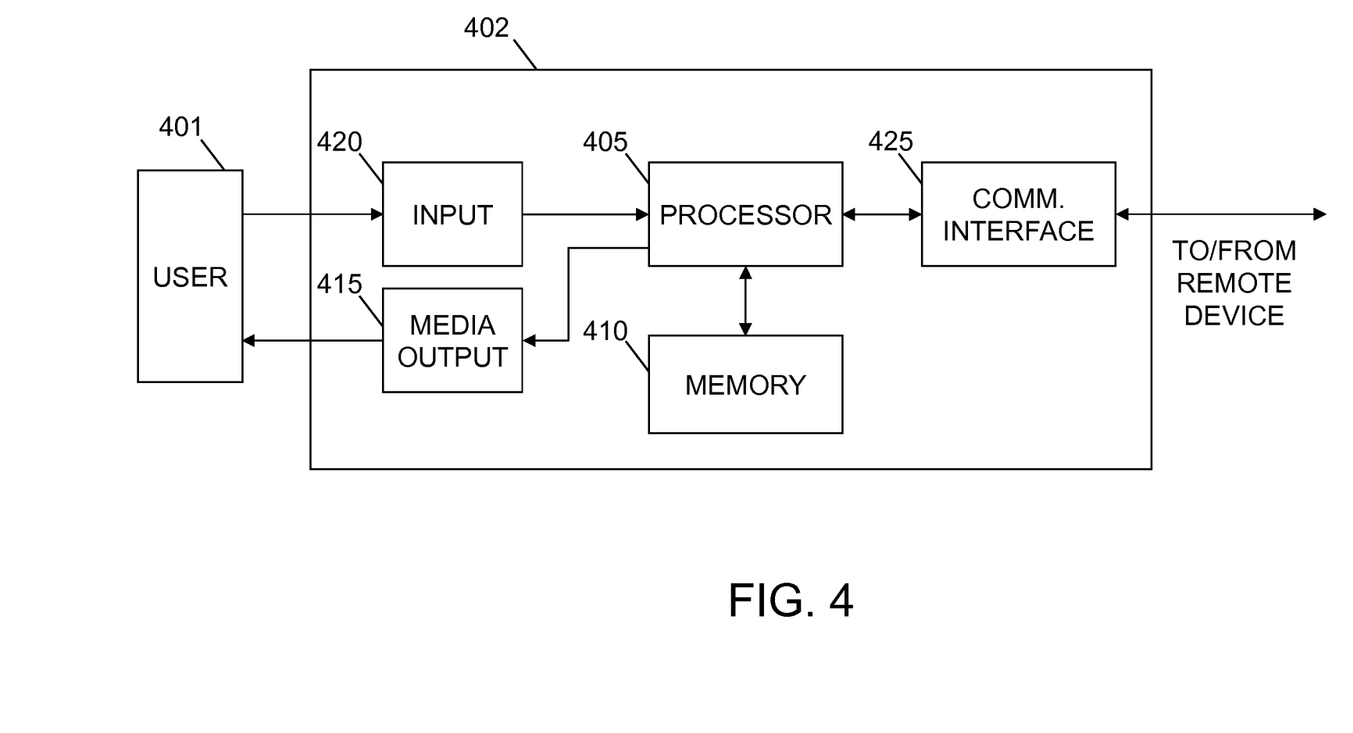
FIG. 4 illustrates an example configuration of a client system shown in FIGS. 2 and 3.

FIG. 4 illustrates an example configuration of a cardholder computing device 402 operated by a cardholder 401. Cardholder computing device 402 may include, but is not limited to, client systems ("client computing devices") 204, 316, 318, and 320, workstation 330, and manager workstation 332 (shown in FIG. 3). The configuration of cardholder computing device 402 is also representative of point-of-sale device 212.

Cardholder computing device 402 includes one or more processors 405 for executing instructions. In some embodiments, executable instructions are stored in a memory area 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Cardholder computing device 402 also includes at least one media output component 415 for presenting information to cardholder 401. Media output component 415 is any component capable of conveying information to cardholder 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, cardholder computing device 402 includes an input device 420 for receiving input from cardholder 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Cardholder computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to cardholder 401 via media output component 415 and, optionally, receiving and processing input from input device 420. A user interface may include, among other possibilities, a web browser and client application. Web browsers enable cardholders, such as cardholder 401, to display and interact with media and other information typically embedded on a web page or a website from server system 202 or a web server associated with a merchant. A client application allows cardholder 401 to interact with a server application from server system 202 or a web server associated with a merchant.

Figure 5:
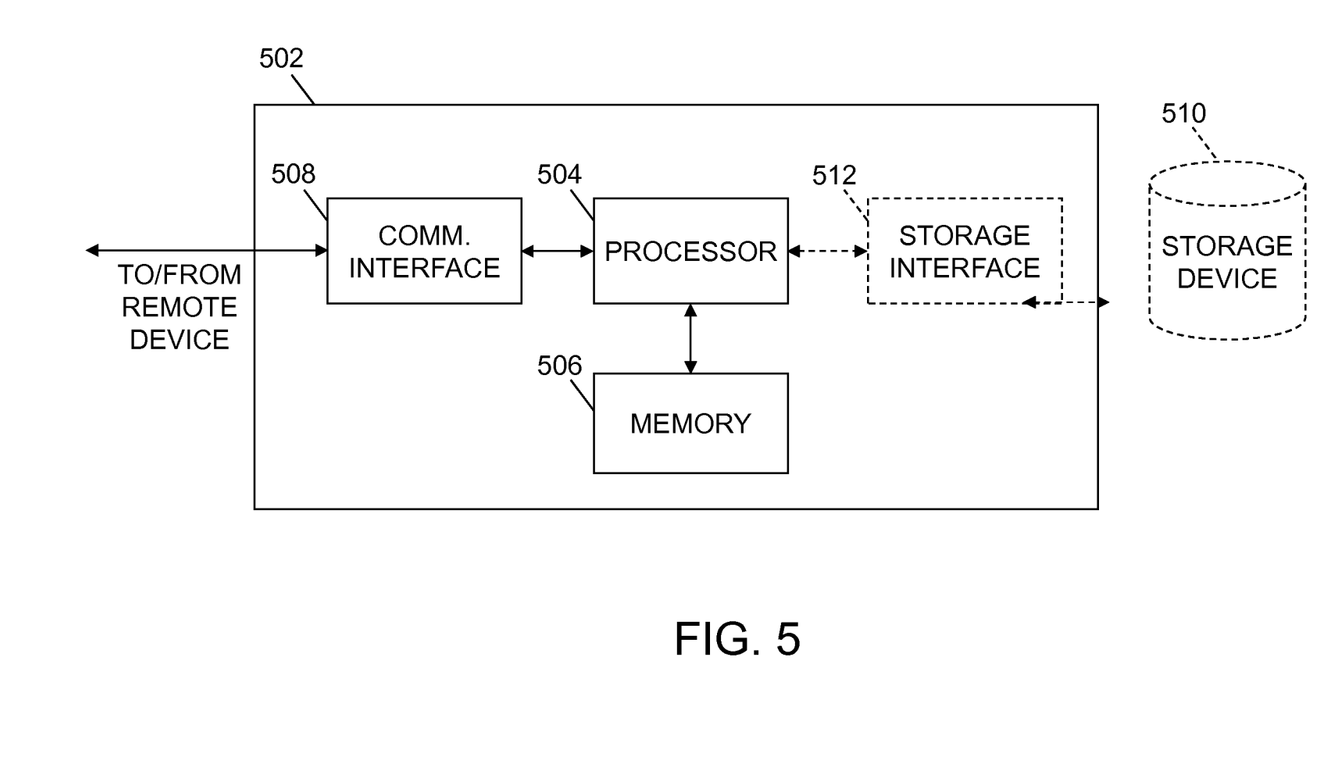
FIG. 5 illustrates an example configuration of a server system shown in FIGS. 2 and 3.

FIG. 5 illustrates an example configuration of a server computing device 502 such as server system 202 (shown in FIGS. 2 and 3). Server computing device 502 may include, but is not limited to, database server 206, application server 302, web server 304, fax server 306, directory server 308, and mail server 310. Server computing device 502 is also representative of reward determination computing device 210.

Server computing device 502 includes one or more processors 504 for executing instructions. Instructions may be stored in one or more memory devices 506, for example. One or more processors 504 may include one or more processing units (e.g., in a multi-core configuration).

One or more processors 504 are operatively coupled to a communication interface 508 such that server computing device 502 is capable of communicating with a remote device such as cardholder computing device 402 or another server computing device 502. For example, communication interface 508 may receive requests from client systems 204 via the Internet, as illustrated in FIGS. 2 and 3.

One or more processors 504 may also be operatively coupled to one or more storage devices 510. One or more storage devices 510 are any computer-operated hardware suitable for storing and/or retrieving data. In some embodiments, one or more storage devices 510 are integrated in server computing device 502. For example, server computing device 502 may include one or more hard disk drives as one or more storage devices 510. In other embodiments, one or more storage devices 510 are external to server computing device 502 and may be accessed by a plurality of server computing devices 502. For example, one or more storage devices 510 may include multiple storage units such as hard disks or solid state disks in a redundant array of inexpensive disks (RAID) configuration. One or more storage devices 510 may include a storage area network (SAN) and/or a network attached storage (NAS) system. In some embodiments, one or more storage devices 510 may include database 208 and/or external database 338.

In some embodiments, one or more processors 504 are operatively coupled to one or more storage devices 510 via a storage interface 512. Storage interface 512 is any component capable of providing one or more processors 504 with access to one or more storage devices 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing one or more processors 504 with access to one or more storage devices 510.

One or more memory devices 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
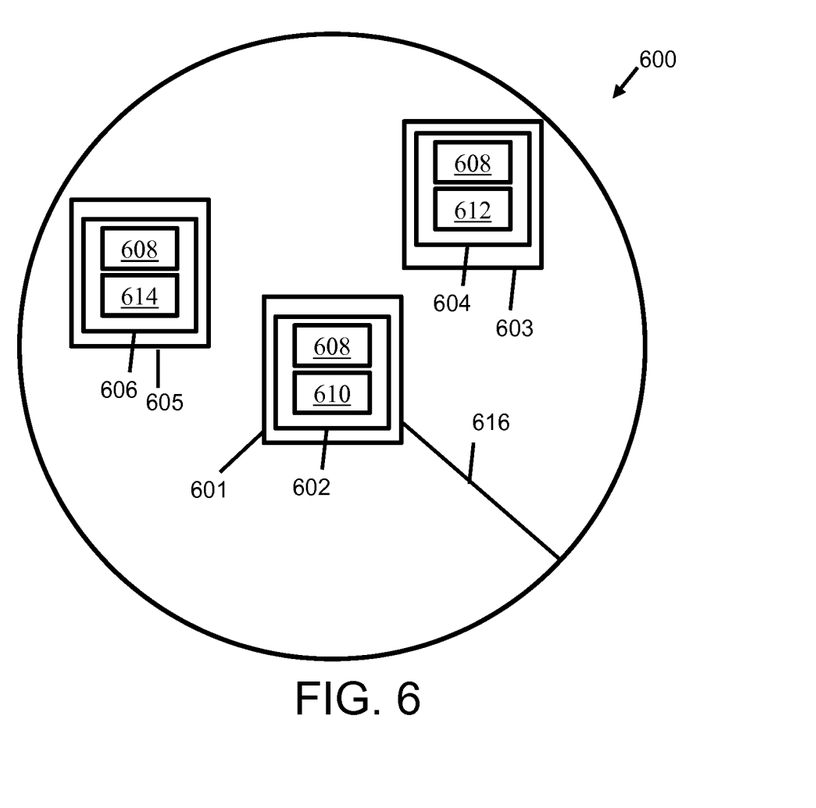
FIG. 6 is a block diagram of an example geographic region in which merchants offer the same product at different prices.

FIG. 6 is a block diagram of an example geographic region 600 in which a first merchant 602, a second merchant 604, and a third merchant 606 operate. First merchant 602 is at a first location 601, second merchant 604 is at a second location 603, and third merchant 606 is at a third location 605. Each of first merchant 602, second merchant 604, and third merchant 606 sells the same grade of gasoline 608. First merchant 602 sells gasoline 608 at a first price 610 of $3.50 per gallon. Second merchant 604 sells gasoline 608 at a second price 612 of $3.47 per gallon, and third merchant 606 sells gasoline 608 at a third price 614 of $3.49 per gallon. Second merchant 304 and third merchant 606 are within a predetermined geographic distance 616 of first merchant 602. Predetermined geographic distance 616 (i.e., a radius from first merchant 602) may be, for example, five miles. In some implementations, predetermined geographic distance 616 is a setting that may be adjusted in reward determination computing device 210.

Cardholder 122 purchases ten gallons of gasoline 608 from first merchant 602, for a total price of $35.00, by initiating a transaction using a payment card over payment card system 120. Server system 202 processes the financial transaction for the purchase of gasoline 608 in accordance with the description of FIG. 1 above. Accordingly, server system 202 receives an authorization request message from first merchant 602 for a purchase price of $35.00. The authorization request message may include an identifier of first merchant 602. The authorization request message may include a product identifier (e.g., a SKU, or other identifier) identifying the product sold. For example, the product identifier may identify the grade of gasoline 608 purchased by cardholder 122.

Reward determination computing device 210 is configured to access merchant identification data, merchant location data, and prices 610, 612, and 614 for gasoline 608 through one of more of database 208 and external database 338. Reward determination computing device 210 may determine from the purchase price, the identifier of first merchant 602, and price 610, that cardholder 122 purchased ten gallons of gasoline 608. Additionally, reward determination computing device 210 may determine that, of merchants 602, 604, and 606, second merchant 604 sells gasoline 608 at the lowest price. That is, second price 612 is lower than first price 610 and third price 614. Reward determination computing device 210 may determine a price differential between first price 610 and second price 612, which is $0.03. Additionally, reward determination computing device 210 may store the price differential to database 208. Additionally, reward determination computing device 210 may multiply the number of gallons of gasoline 608 (i.e., ten gallons) purchased by cardholder 122 by the price differential of $0.03 to arrive at a reward of $0.30. Reward determination computing device 210 may apply the reward to account 132 associated with cardholder 122. For example, reward determination computing device 210 may apply a credit of $0.30 to account 132. Reward determination computing device 210 may apply the reward immediately after the purchase takes place or at a later time. In some implementations, reward determination computing device 210 maintains a log of rewards to be applied to account 132 and applies the rewards according to a schedule (e.g., once a month). In some implementations, cardholder 122 may access reward determination computing device 210, for example through cardholder computing device 402, and view rewards that have been and/or are scheduled to be applied to account 132. In some implementations, reward determination computing device 210 does not apply the reward to account 132 directly, but rather transmits an instruction to server system 202 to apply the reward to account 132.

Figure 7:
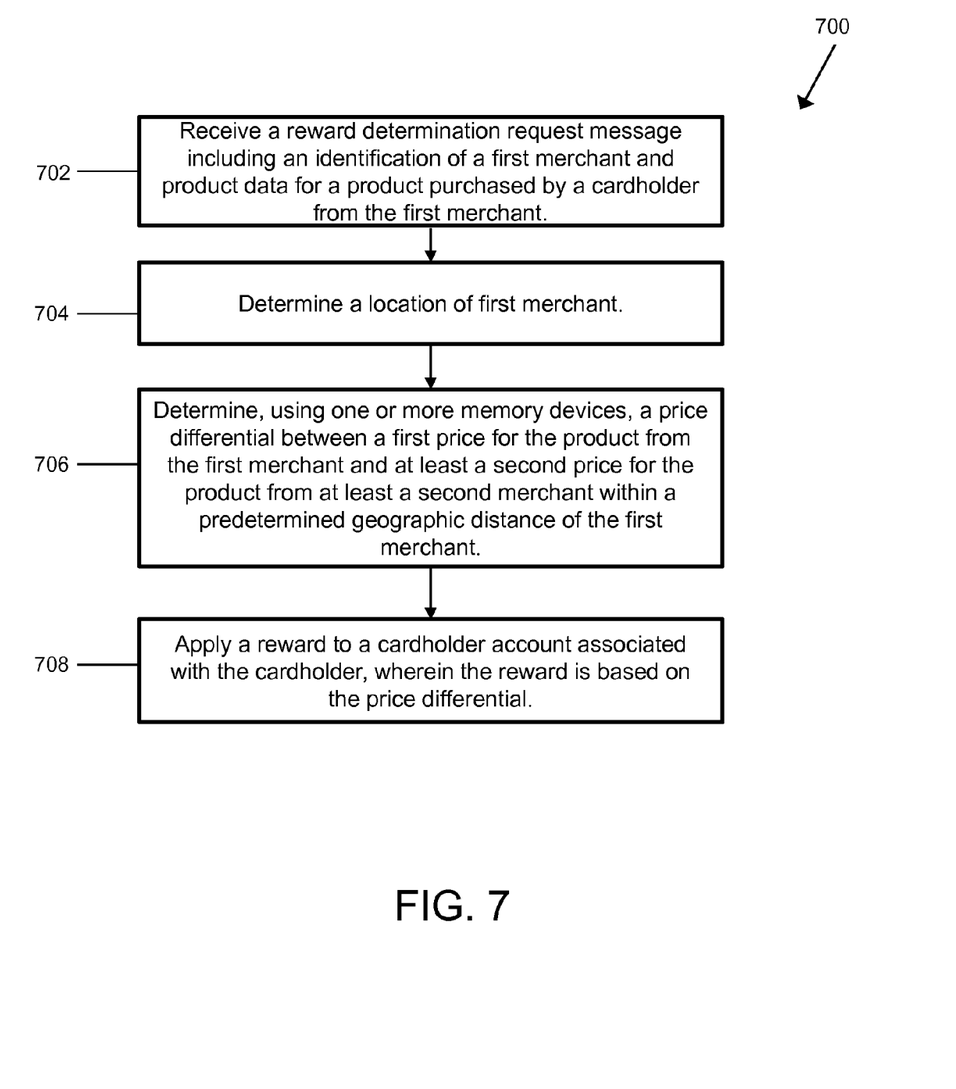
FIG. 7 is a flowchart of an example process that may be performed by the reward determination system of FIGS. 2 and 3 for providing a reward based on a price differential for a product.

FIG. 7 is a flowchart of an example process 700 that may be performed by the payment processing system 200, and more specifically, reward determination computing device 210, for providing a reward based on a price differential for a product (e.g., gasoline 608). Initially, reward determination computing device 210 receives 702 a reward determination request message from server system 202 including an identifier of a first merchant (e.g., first merchant 602), and product data. The product data may include an identification of a product (e.g., gasoline 608), and may additionally include a price paid for the product. For example, server system 202 may receive an authorization request message for the purchase of gasoline 608 from first merchant 602 and may transmit the identifier of first merchant 602 and product data regarding gasoline 608 to reward determination computing device 210 in a reward determination request message. Additionally, reward determination computing device 210 determines 704 a location of first merchant 602. For example, reward determination computing device 210 may cross-reference an identifier of first merchant 602 included in the reward determination request message with a location (e.g., first location 601) associated with first merchant 602 stored in database 208 and/or external database 338. Additionally, reward determination computing device 202 determines 706, using database 208 and/or external database 338, a price differential between a first price (e.g., first price 610) for the product (e.g., gasoline 608) from first merchant 602 and at least a second price (e.g., second price 612) for the product (e.g., gasoline 608) from at least the second merchant (e.g., second merchant 604) within a predetermined geographic distance (e.g., predetermined geographic distance 616) of first merchant 602. Additionally, reward determination computing device 210 applies 708 a reward to a cardholder account associated with the authorization request (e.g., account 132 of cardholder 122). The reward is based on the price differential. For example, as discussed with reference to FIG. 6, the reward may be a credit of $0.30, based on a price differential of $0.03 and a purchase of ten gallons of gasoline 608.

In some implementations, the authorization request message is a first authorization request message and server system 202 populates database 208 with at least the second price (e.g., second price 612) based on a second authorization request message associated with the second merchant (e.g., second merchant 604). In some implementations, server system 202 and/or reward determination computing device 210 determines a price per unit of the product. For example, reward determination computing device 210 may determine a price per gallon of gasoline 608. In some implementations, the predetermined geographic distance is, for example, five miles. In some implementations, reward determination computing device 210 determines a lowest price among a plurality of merchants, including second merchant 604 and third merchant 606, and determines the price differential between first price 610 and the lowest price (e.g., second price 612), as described with reference to FIG. 6. In some implementations, reward determination computing device 210 populates database 208 based, at least in part, on a third-party database (e.g., external database 338) of prices for the product (e.g., gasoline 608). In some implementations, reward determination computing device 210 receives a stock keeping unit ("SKU") as a product identifier in the reward determination request message.

Figure 8:
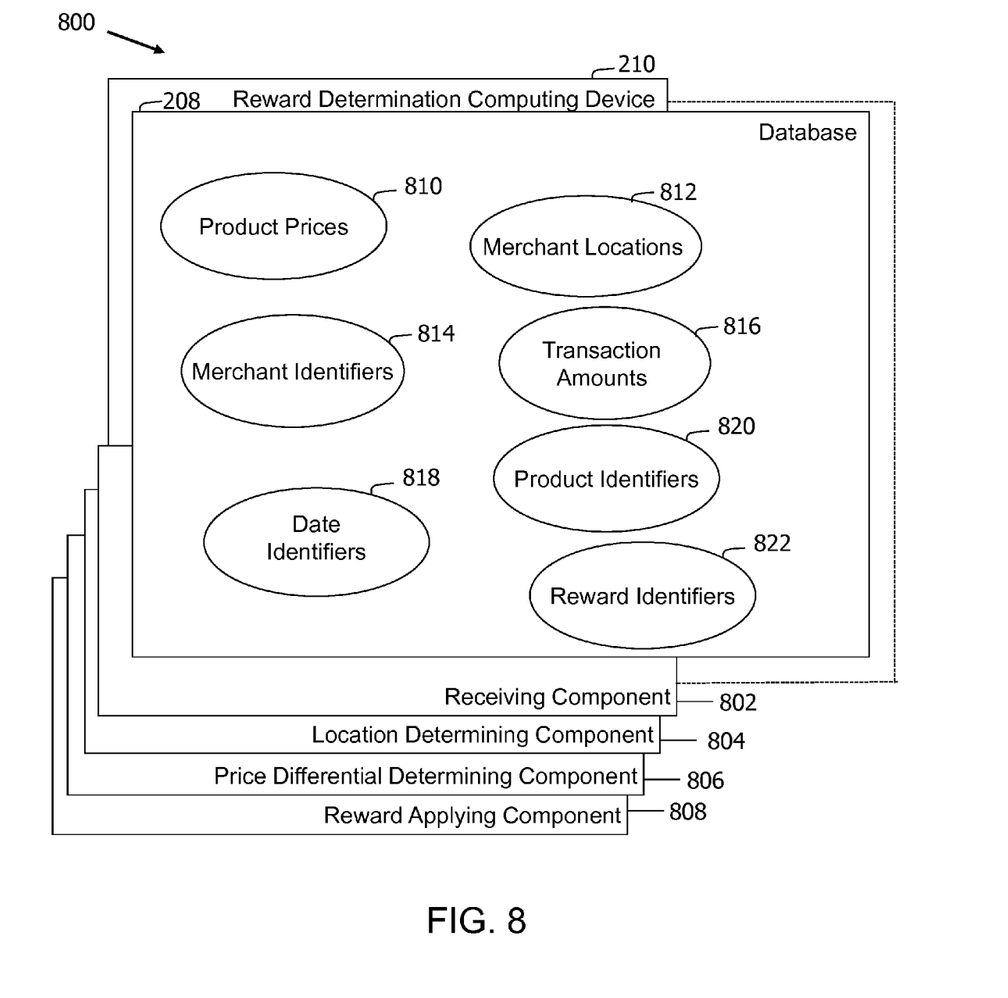
FIG. 8 is a diagram of components of one or more example computing devices that may be used in the reward determination system shown in FIGS. 2 and 3.

FIG. 8 is a diagram 800 of components of one or more example computing devices, for example, reward determination computing device 210, that may be used in embodiments of the described systems and methods. FIG. 8 further shows a configuration of database 208 (FIG. 2). Database 208 is communicatively coupled to reward determination computing device 210.

Reward determination computing device 210 includes a receiving component 802 for receiving a reward determination request message from server system 202, based, for example, on an authorization request from a first merchant 602 for a product. The reward determination request message may include an identification of first merchant 602 and product data for the product (e.g., gasoline 608) purchased by cardholder 122 from first merchant 602. Reward determination computing device 210 also includes a location determining component 804 for determining a location of the first merchant 602. Server system 202 additionally includes a price differential determining component 806 for determining, using one or more memory devices (e.g., database 208), a price differential between a first price 610 for the product 608 from the first merchant 602 and at least a second price 612 for the product 608 from at least a second merchant 604 within a predetermined geographic distance 616 of the first merchant 602. Additionally, reward determination computing device 210 includes a reward applying component 808 for applying a reward to a cardholder account 132, wherein the reward is based on the price differential. For example, the reward may be applied as a credit to the cardholder account 132.

In an example embodiment, database 208 is divided into a plurality of sections, including but not limited to, a product prices section 810, a merchant locations section 812, a merchant identifiers section 814, a transaction amounts section 816, a date identifiers section 818, which includes, for example, transaction dates, a product identifiers section 820, and a reward identifiers section 822. A reward identifier may be used to determine the application of an appropriate reward based off of a category such as industry or merchant grouping. These sections within database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for providing a reward based on a price differential for a product enable a cardholder to purchase a product at a given price from a first merchant and receive a reward based on a price differential between the price paid by the cardholder and a lower price offered for the same product by a second merchant located within a predetermined geographic distance of the first merchant. Accordingly, embodiments of the systems and method described herein may reduce or eliminate the amount of time the cardholder might otherwise spend comparing prices among merchants prior to purchasing a product.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for providing a reward based on a price differential for a product, said method implemented using a computing device in communication with one or more memory devices, said method comprising:

initiating a transaction at a location of a first merchant using a payment card of a cardholder account associated with a cardholder;

receiving, by the computing device, a reward determination request message including an identification of the first merchant and product data for a product purchased in the transaction by the cardholder from the first merchant, the reward determination request message based on an authorization request message sent from an electronic device of the first merchant;

determining, by the computing device, a location of the first merchant;

determining, using the one or more memory devices, the price differential between a first price for the product from the first merchant and at least a second price for the product from at least a second merchant within a predetermined geographic distance of the location of the first merchant; and applying, in response to the reward determination request message, a reward to the cardholder account, wherein the reward is based on the determination of the price differential by the computing device.

2. The method of claim 1, wherein the authorization request message is a first authorization request message, the method further comprising populating the one or more memory devices with at least the second price based on a second authorization request message associated with the second merchant.

3. The method of claim 1, wherein the product is fuel, the method further comprising determining a price per unit of the fuel.

4. The method of claim 1, wherein the at least a second merchant is a plurality of merchants, the method further comprising determining a lowest price for the product among the plurality of merchants, and determining the price differential further comprises determining the price differential between the first price and the lowest price.

5. The method of claim 1, further comprising populating the one or more memory devices based at least in part on a third-party database of prices for the product.

6. The method of claim 1, wherein the reward is a credit to the cardholder account.

7. The method of claim 1, wherein receiving the reward determination request including product data further comprises receiving a product identifier for the product.

8. The method of claim 7, wherein receiving the product identifier further comprises receiving a stock keeping unit (SKU).

9. A computing device for providing a reward based on a price differential for a product, said computing device comprising one or more processors in communication with one or more memory devices, said computing device configured to:

receive a reward determination request message including an identification of a first merchant and product data for a product purchased by a cardholder from the first merchant, the reward determination request message based on an authorization request message sent from an electronic device of the first merchant;

determine a location of the first merchant;

determine, using said one or more memory devices, a price differential between a first price for the product from the first merchant and at least a second price for the product from at least a second merchant within a predetermined geographic distance of the location of the first merchant; and apply, in response to the reward determination request message, a reward to a cardholder account associated with the cardholder, wherein the reward is based on the determination of the price differential by the computing device.

10. The computing device of claim 9, wherein the authorization request message is a first authorization request message, said computing device further configured to populate said one or more memory devices with at least the second price based on a second authorization request message associated with the second merchant.

11. The computing device of claim 9, wherein said computing device is associated with a payment network.

12. The computing device of claim 9, wherein the product is fuel and said computing device is further configured to determine a price per unit of the fuel.

13. The computing device of claim 9, wherein the at least a second merchant is a plurality of merchants and said computing device is further configured to determine a lowest price for the product among the plurality of merchants, and determine the price differential by determining the price differential between the first price and the lowest price.

14. The computing device of claim 9, wherein said computing device is further configured to populate said at least one memory device based at least in part on a third-party database of prices for the product.

15. The computing device of claim 9, wherein said computing device is further configured such that applying a reward comprises applying a credit to the cardholder account.

16. The computing device of claim 9, wherein said computing device is further configured to receive a product identifier associated with the product.

17. A non-transitory computer-readable storage medium having computer-executable instructions embodied thereon, wherein when executed by a computing device having one or more processors in communication with one or more memory devices, the computer-executable instructions cause the computing device to:

receive a reward determination request message including an identification of a first merchant and product data for a product purchased by a cardholder from the first merchant, the reward determination request message based on an authorization request message sent from an electronic device of the first merchant;

determine a location of the first merchant;

determine, using the one or more memory devices, a price differential between a first price for the product from the first merchant and at least a second price for the product from at least a second merchant within a predetermined geographic distance of the location of the first merchant; and apply, in response to the reward determination request message, a reward to a cardholder account associated with the cardholder, wherein the reward is based on the determination of the price differential by the computing device.

18. The non-transitory computer-readable storage medium of claim 17, wherein the at least a second merchant is a plurality of merchants and said computer-executable instructions further cause the computing device to determine a lowest price for the product among the plurality of merchants, and determine the price differential by determining the price differential between the first price and the lowest price.

* * * * *